United States Patent
Navasivasakthivelsamy et al.

(10) Patent No.: US 11,818,001 B2
(45) Date of Patent: Nov. 14, 2023

(54) METHOD AND SYSTEM FOR EFFICIENT LAYER-2 EXTENSION FOR INDEPENDENTLY-MANAGED SUBNETS

(71) Applicant: Nutanix, Inc., San Jose, CA (US)

(72) Inventors: Arunkumar Navasivasakthivelsamy, Sammamish, WA (US); Ramesh Gopalakrishnan Iyer, Fremont, CA (US); Ritesh Rekhi, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 33 days.

(21) Appl. No.: 17/688,561

(22) Filed: Mar. 7, 2022

(65) Prior Publication Data
US 2023/0132740 A1    May 4, 2023

Related U.S. Application Data

(60) Provisional application No. 63/273,077, filed on Oct. 28, 2021.

(51) Int. Cl.
*G06F 15/177* (2006.01)
*H04L 41/0813* (2022.01)
(Continued)

(52) U.S. Cl.
CPC .......... *H04L 41/0813* (2013.01); *G06F 9/547* (2013.01); *H04L 67/133* (2022.05); *H04L 67/141* (2013.01)

(58) Field of Classification Search
None
See application file for complete search history.

(56) References Cited

U.S. PATENT DOCUMENTS

| 8,549,518 B1 | 10/2013 | Aron et al. |
| 8,601,473 B1 | 12/2013 | Aron et al. |

(Continued)

FOREIGN PATENT DOCUMENTS

EP    2974234 B1 *  12/2020 ......... G06F 9/45558

OTHER PUBLICATIONS

D. I. Wolinsky, Y. Liu, P. S. Juste, G. Venkatasubramanian and R. Figueiredo, "On the design of scalable, self-configuring virtual networks," Proceedings of the Conference on High Performance Computing Networking, Storage and Analysis, 2009, pp. 1-12, doi: 10.1145/1654059.1654073. (Year: 2009).*

(Continued)

*Primary Examiner* — Yves Dalencourt
(74) *Attorney, Agent, or Firm* — Shun Yao; YAO LEGAL SERVICES, INC.

(57) ABSTRACT

One embodiment of the present invention provides a system for facilitating layer-2 subnet extension. During operation, the system can query, from a first administrative domain, a remote database of a second administrative domain for configuration information associated with one or more remote network segments. The system can obtain, from a user interface of the first administrative domain, an instruction for performing layer-2 subnet extension from a first network segment under the first administrative domain to a second network segment of the one or more remote network segments for providing a common layer-2 broadcast domain. The system can then send a remote instruction executable in the second administrative domain for configuring a remote endpoint for the extension. The system can also configure a local endpoint in the first network segment for the extension. Subsequently, the system can establish a data connection between the local and remote endpoints for the extension.

18 Claims, 13 Drawing Sheets

(51) Int. Cl.
*G06F 9/54* (2006.01)
*H04L 67/141* (2022.01)
*H04L 67/133* (2022.01)

(56) References Cited

U.S. PATENT DOCUMENTS

| | | | |
|---|---|---|---|
| 8,850,130 B1 | 9/2014 | Aron et al. | |
| 9,014,054 B2* | 4/2015 | Dunbar | H04L 12/462 370/255 |
| 9,772,866 B1 | 9/2017 | Aron et al. | |
| 2015/0067132 A1* | 3/2015 | Naseh | H04L 47/122 709/223 |
| 2020/0382471 A1* | 12/2020 | Janakiraman | H04L 61/5007 |
| 2022/0210158 A1* | 6/2022 | Brar | H04L 47/2483 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https://nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Poitras, Steven. "The Nutanix Bible" (Jan. 8, 2019), from https://nutanixbible.com/ pp. all.

Poitras, Steven. "The Nutanix Bible" (Jul. 25, 2019), from https://nutanixbible.com/ pp. all.

Poitras, Steven. "The Nutanix Bible" (Sep. 17, 2019), from https://nutanixbible.com/ pp. all.

Cano, Ignacio et al. "Curator: Self-Managing Storage for Enterprise Clusters"; University of Washington; published Mar. 2017; pp. all.

Poitras, Steven. "The Nutanix Bible" (Jan. 21, 2020), from https://nutanixbible.com/ pp. all.

Poitras, Steven. "The Nutanix Bible" (Sep. 14, 2020), from https://nutanixbible.com/ pp. all.

Poitras, Steven. "The Nutanix Bible" (Dec. 31, 2020), from https://nutanixbible.com/ pp. all.

Poitras, Steven. "The Nutanix Bible" (Jul. 27, 2022), from https://nutanixbible.com/ pp. all.

* cited by examiner

METHOD AND SYSTEM FOR EFFICIENT LAYER-2 EXTENSION FOR INDEPENDENTLY-MANAGED SUBNETS

RELATED APPLICATIONS

This application claims the benefit of U.S. Provisional Application No. 63/273,077, titled "System and Method for Streamlined Setup of Layer-2 Subnet Extension between Sites," by inventors Arun Navasivasakthivelsamy, Ramesh Iyer, and Ritesh Rekhi, filed 28 Oct. 2021, the disclosure of which is incorporated by reference herein.

BACKGROUND

Field

The present disclosure relates to a communication network. More specifically, the present disclosure relates to efficiently facilitating layer-2 extension for independently-managed subnets at different sites.

Related Art

As Internet traffic is becoming more diverse, cluster-based services are becoming progressively more important as a value proposition for distributed systems. In addition, the evolution of virtualized computing has made a multi-client environment attractive and, consequently, placed additional requirements on the distributed systems. For example, a large number of devices (e.g., servers and service appliances) can be distributed across multiple sites (e.g., at geographically distributed locations). Each site may include one or more devices, such as virtual machines (VMs). It is often desirable that the distributed system can facilitate a device management system that can allow a client to configure the devices at a respective site.

Typically, a respective device in a site can be assigned with an Internet Protocol (IP) address. The IP addresses can be allocated from a subnet configured for the site. The site may host one or more of such subnets. Since the client may deploy devices at different sites, the client may configure the same subnet across multiple sites. Hence, the devices belonging to the same subnet can be deployed at different sites. However, individual sites can be managed independently. In particular, devices in a respective site can be managed by an individual instance of the device management system. As a result, maintaining a coherent and error-free subnet across multiple sites can be challenging.

SUMMARY

One embodiment of the present invention provides a system for facilitating efficient layer-2 subnet extension. During operation, the system can query, from a first administrative domain, a remote database of a second administrative domain for network configuration information. The network configuration information can include identifying information of one or more remote network segments configured under the second administrative domain. The system can obtain, from a user interface of the first administrative domain, an instruction for performing layer-2 subnet extension from a first network segment under the first administrative domain to a second network segment of the one or more remote network segments. The extension can provide a common layer-2 broadcast domain comprising the first and second network segments. The system can then send a remote instruction executable in the second administrative domain for configuring a remote endpoint in the second network segment for the extension. The system can also configure a local endpoint in the first network segment for the extension. Subsequently, the system can establish a data connection between the local and remote endpoints for the extension.

In a variation on this embodiment, the network configuration information can also include identifying information of a respective endpoint available for extension under the second administrative domain. The instruction can then include identifying information of the remote endpoint.

In a variation on this embodiment, the system can query the remote database by sending a remote procedure call (RPC) to the remote database over a control channel coupling the first and second administrative domains.

In a further variation, the system can receive, via the control channel, a notification indicating that the remote endpoint is configured for the extension. The system can then configure the local endpoint upon receiving the notification.

In a variation on this embodiment, the data connection can include a tunnel established over a control channel between the local and remote endpoints.

In a variation on this embodiment, the system can store configuration information associated with the local endpoint in a local database of the first administrative domain.

In a variation on this embodiment, the system can obtain the instruction for performing the extension by receiving, from the user interface, an application programming interface (API) function call specific to the initiation of the extension. The system can then determine the instruction from the API function call.

In a variation on this embodiment, the system can obtain, from the user interface, a second instruction for disabling the extension. The system can then send a second remote instruction executable in the second administrative domain for configuring the remote endpoint for disabling the extension. Subsequently, the system can configure the local endpoint for disabling the extension.

In a variation on this embodiment, before sending the remote instruction, the system may validate whether the extension can be performed by applying a set of validation rules on the network configuration information. If the validation is unsuccessful, the system may provide an error notification to the user interface without sending the remote instruction.

In a variation on this embodiment, the system may determine an error associated with the configuration of the local endpoint and retry to configure the local endpoint for a threshold number of times.

BRIEF DESCRIPTION OF THE FIGURES

In the figures, like reference numerals refer to the same figure elements.

DETAILED DESCRIPTION

Figure 1A:
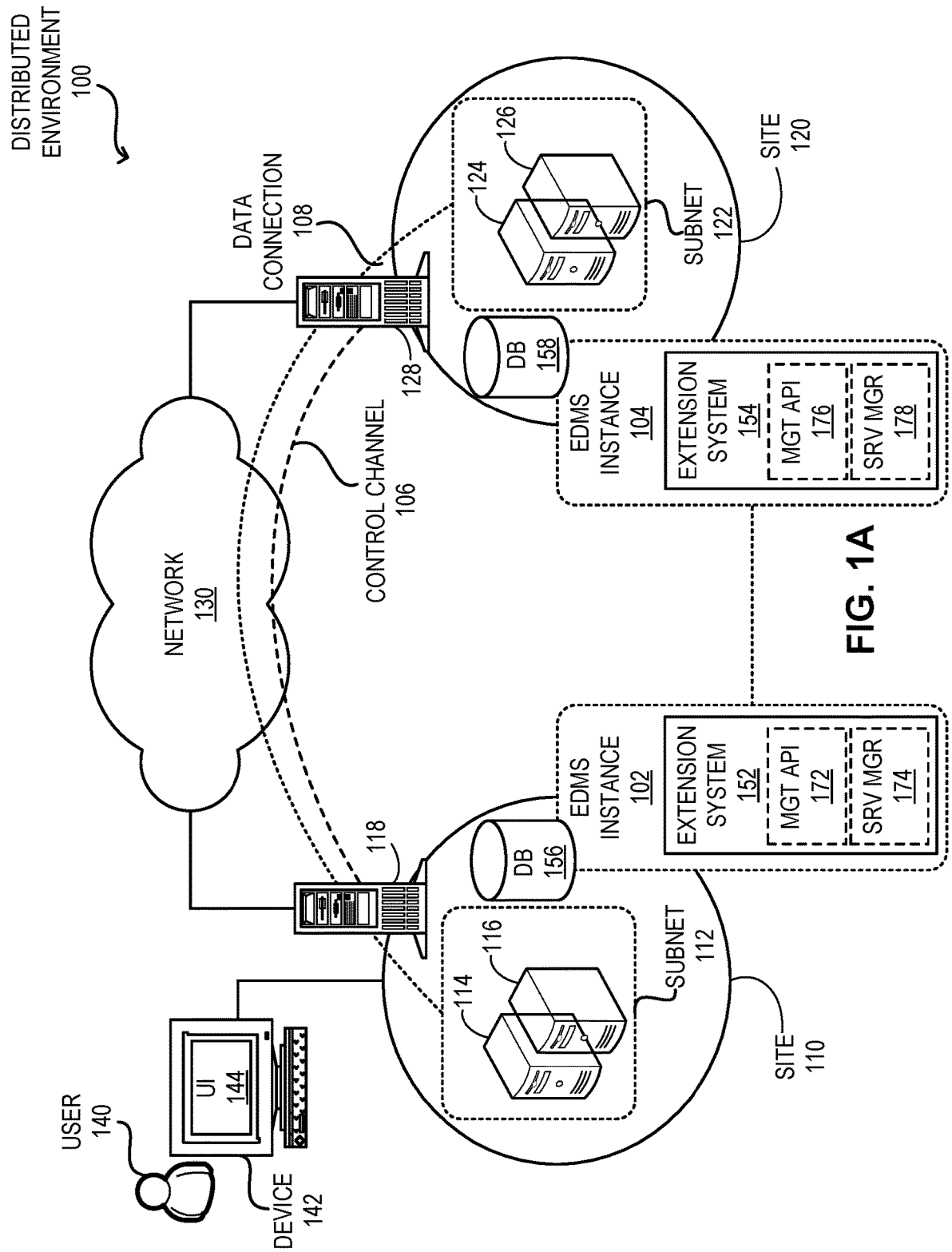
FIG. 1A illustrates exemplary efficient layer-2 extension for independently-managed subnets, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments described herein solve the problem of efficiently facilitating layer-2 extension for independently-managed subnets from a device management instance by (i) issuing remote instructions to a remote device management instance for configuring remote resources; (ii) configuring local resources in accordance with the remote configurations; and (iii) using the configured resources for establishing a connection for facilitating a layer-2 broadcast domain. In this way, from a single instance, subnets independently managed by different instances can be configured to establish layer-2 extension. Here, the different subnets can be in different physically or logically separate sites.

A distributed environment, such as an enterprise or a service provider platform, can be deployed across multiple sites. A service provider environment may facilitate one or more of: infrastructure as a service (IaaS), platform as a service (PaaS), software as a service (SaaS), and variations thereof. A respective site of the distributed environment may include a number of devices. Examples of a device in the site can include, but are not limited to, a server, an appliance, a VM, an application, and a container. The devices of a site are typically managed by a device management system (DMS). Examples of a DMS include, but are not limited to, Prism Central, vRealize Operations (vROps), Turbonomic manager, and Veeam ONE.

A respective device in a site may be configured with an IP address based on a subnet associated with the site using a DMS. The devices belonging to the same subnet often belong to the same layer-2 broadcast domain (e.g., a virtual local area network (VLAN)). Hence, if a subnet is configured at multiple sites, the corresponding layer-2 network can be distributed into corresponding multiple layer-2 network segments. To facilitate a single layer-2 broadcast domain across the layer-2 network segments, the subnet is often extended among the sites to ensure that the devices can efficiently communicate with each other. Layer-2 subnet extension can involve extending the layer-2 broadcast domain from the subnet of one site to the subnet of another site through a data connection (e.g., a layer-3 connection). This allows devices of the subnet on one site to communicate with devices of the subnet on the other site as if they belong to the same broadcast domain.

With existing technologies, some DMSs may support subnet extensions. However, the devices of a respective site can be independently managed by corresponding instances of the DMS. In other words, the sites can be under respective independent administrative domains. Hence, even if the devices at different sites belong to the same subnet, these devices are independently managed. Consequently, the layer-2 subnet extension may involve configuring parameters associated with the extension at each of the sites independently. Furthermore, subnet extension may rely on additional conditions, such as non-overlapping IP addresses and a matching subnet prefix. However, due to independent management of a respective site, a user (e.g., a network administrator) may manually and separately validate these conditions. As a result, the layer-2 subnet extension process can be tedious and error-prone.

To solve this problem, a DMS can be enhanced such that the layer-2 subnet extension can be initiated and completed at one of the sites of a distributed environment. The enhanced DMS (EDMS) can also facilitate subsequent monitoring and management of the extension through any of the sites. A respective site can be independently managed by an EDMS instance dedicated for the site. Hence, if the environment includes n such sites, the environment can be managed by n EDMS instances. In this way, a respective EDMS instance can provide an independent management domain at the corresponding site. The EDMS instance of a site may run on one or more devices. The site may also include a dedicated device (e.g., a server or appliance) that may host the EDMS instance for that site.

A respective EDMS instance can provide a user interface (UI) that allows a user to configure a device under the management of the EDMS instance and display operational information (e.g., configured parameters, performance data, etc.) of the management domain. Examples of the UI can include, but are not limited to, a graphical UI (GUI), a textual interface (e.g., a command-line interface (CLI)), a web-based interface, and a combination thereof. Using the UI, the user may configure one or more subnets at a respective site using the corresponding EDMS instance. Typically, a respective subnet can include at least one gateway (e.g., a server, VM, or switch) that couples the subnet with an external network. The gateway can be an individual device or a plurality of devices operating as a single device. An IP address, such as a virtual IP address, can be assigned to the gateway. The virtual IP address can be a "floating" IP address allocated to the plurality of devices. The virtual IP address can float among the devices of the gateway.

The user can also use the corresponding UIs to couple a respective EDMS instance pair via a control plane connection (or a control channel). For example, the control channel can be any connection that allows communication between the EDMS instances. In other words, the control channel can facilitate bi-directional communication with each other over a remote connection (RC) channel. If the underlying control channel is based on a secure protocol, the RC channel can be an authenticated RC channel. The control channel can be established between the respective gateways of the sites. Examples of a control channel can include, but are not limited to, an Internet Protocol Security (IPsec) tunnel, a Multiprotocol Label Switching (MPLS) connection, a virtual private network (VPN) connection, and a combination thereof.

During operation, based on an input from the user, the UI may provide a command to initiate the layer-2 subnet extension. The command can be generated at the UI based on the user's selection of the layer-2 subnet extension from a list of supported operations presented in the UI. Since the layer-2 subnet extension is facilitated by the EDMS instance, it can also be referred to as the initiator EDMS instance. To facilitate the issuance of the command, the UI can present a list of remote sites. The user may select a remote site for the extension from the list. The EDMS instance can then identify the corresponding remote EDMS instance of the remote site.

The EDMS instance can then send a query requesting relevant information to the remote EDMS instance. The query can be based on a remote procedure call (RPC) issued to the remote EDMS instance via the control channel. The remote EDMS instance can then check the configuration repository of the remote site and obtain the information. In some embodiments, the repository can be a database (e.g., a relational database instance) managed based on a database management system (DBMS). The configuration database can also be referred to as an insight database that stores information associated with the network fabric deployed at the remote site. The obtained information can indicate one or more of: a respective subnet and a respective endpoint (e.g., the communication interface for the control channel) configured at the remote site.

The remote EDMS instance can then send a response comprising the information. Upon receiving the response, the EDMS instance can provide the information to the user via the UI. The presented information can include a selectable list showing the subnets at the remote site. The user can then issue an extension request by selecting the subnet for the extension. In the same way, the user may also select a gateway at the remote site for establishing the extension. If the user does not select a gateway, the EDMS instance may select a gateway based on a selection policy (e.g., availability-based, random, or load-based selection). The EDMS instance can then perform a validation operation for the extension based on a set of validation rules (e.g., non-overlapping IP addresses and a matching subnet prefix).

Upon determining that the extension request is valid, the EDMS instance can send an instruction for extending the subnet to the remote EDMS instance. The instruction can be based on an RPC issued to the remote EDMS instance via the control channel. The remote EDMS instance can then configure the gateway at the remote site and an interface of the control channel via which the subnet is to be extended to the remote site. The interface can be configured to operate as an endpoint of a data connection over the control channel. The remote EDMS instance can also update the configuration database at the remote site with the configuration information and notify the EDMS instance indicating the completion of the configuration.

The EDMS instance can then configure the local gateway and an interface of the control channel via which the subnet is to be extended from the local site. The EDMS instance can also update the local configuration database with the configuration information. Since interfaces at both sites are configured to operate as respective endpoints, the resultant data connection can become operational and carry traffic between the subnets. In some embodiments, the data connection can include a tunnel established based on a tunneling protocol. Examples of a tunneling protocol can include, but are not limited to, Virtual Extensible LAN (VXLAN), Generic Routing Encapsulation (GRE), Network Virtualization Using GRE (NVGRE), Overlay transport virtualization (OTV), and Generic Network Virtualization Encapsulation (Geneve).

Upon establishment of the data connection between the interfaces, the layer-2 data traffic of the extended subnets can be forwarded across the data connection as if the devices belong to the same broadcast domain. This allows devices of the subnet on one site to communicate with devices of the subnet on the other site as if they belong to the same broadcast domain. In this way, the EDMS instance can use RPCs over the pre-existing control channel between the gateways of the subnets to query each other's configuration database to establish a data connection for facilitating layer-2 subnet extension from a single site with automatic validation.

In this disclosure, the term "packet" refers to a group of bits that can be transported together across a network. "Packet" should not be interpreted as limiting embodiments of the present invention to any networking layer. "Packet" can be replaced by other terminologies referring to a group of bits, such as "message," "frame," "cell," or "datagram."

The term "switch" is used in a generic sense, and it can refer to any standalone or fabric switch operating in any network layer. "Switch" should not be interpreted as limiting embodiments of the present invention to layer-2 networks. Any physical or virtual device (e.g., a virtual machine, which can be a virtual switch, operating on a computing device) that can forward traffic to an end device can be referred to as a "switch." Examples of such a device include, but are not limited to, a layer-2 switch, a layer-3 router, or a routing bridge.

System Architecture

FIG. 1A illustrates exemplary efficient layer-2 extension for independently-managed subnets, in accordance with an embodiment of the present application. As illustrated in FIG. 1A, a distributed environment 100 can be distributed across a number of sites 110 and 120 coupled to each other via a network 130. Here, sites 110 and 120 can be physically (e.g., geographically) or logically (e.g., based on device virtualization) separate sites. Environment 100 can facilitate an enterprise network or a service provider platform. A service provider environment may facilitate one or more of: IaaS, PaaS, SaaS, and variations thereof.

Site 110 can include a number of devices 114, 116, and 118. Similarly, site 120 can include a number of devices 124, 126, and 128. Examples of a client device can include, but are not limited to, a desktop or laptop computer, a server-grade computer, an appliance, a VM, an application, a container, a cellular device, a tablet, a wearable device, a stationary or portable gaming console, a projection device, a network device (e.g., a switch), an attachable dongle, an augmented or virtual reality device, and a vehicular device. Network 130 can be an Ethernet and/or IP network, and a respective switch of network 130 can be an Ethernet switch and/or IP router. Hence, the communication among the switches in network 130 can be based on Ethernet and/or IP. Network 130 may be a local area network (LAN) (e.g., a virtual LAN (VLAN)) or a wide area network (e.g., the Internet).

Since network 130 can be coupled to sites 110 and 120 via devices 118 and 128, respectively, devices 118 and 128 may operate as gateways for sites 110 and 120, respectively. The devices of environment 100 can be managed by a DMS. Examples of a DMS include, but are not limited to, Prism Central, vROps, Turbonomic manager, and Veeam ONE. A respective of gateways 118 and 128 can include an individual device or a plurality of devices operating as a single device. Respective gateway IP addresses can be assigned to gateways 118 and 128. A respective gateway IP address can be a floating virtual IP address allocated to the one or more devices that may operate as a gateway.

A user may configure subnets 112 and 122 for sites 110 and 120, respectively. Accordingly, a Dynamic Host Configuration Protocol (DHCP) server hosted by the corresponding DMS instance can allocate corresponding IP addresses of subnet 112 to devices 114 and 116. Similarly, a DHCP server hosted by the corresponding DMS instance can allocate the IP address of subnet 122 to devices 124 and 126. The devices belonging to the same subnet often belong to the same layer-2 broadcast domain (e.g., the same VLAN). Since subnets 112 and 122 are configured at multiple sites, the corresponding layer-2 network can be distributed into corresponding multiple layer-2 network segments. In other words, each of sites 110 and 120 may include one of the layer-2 network segments.

Hence, if subnets 112 and 122 have the same prefix, which may indicate them being the same subnet, subnets 112 and 122 can be extended to facilitate a single layer-2 broadcast domain across the layer-2 network segments of sites 110 and 120, thereby ensuring that their devices can efficiently communicate with each other. Layer-2 subnet extension can involve extending the layer-2 broadcast domain from subnet 112 to subnet 122 (or from subnet 122 to subnet 112) through a data connection (e.g., a layer-3 connection). This allows devices of subnet 112 to communicate with devices of subnet 122 as if they belong to the same broadcast domain.

With existing technologies, some DMSs may support subnet extensions. However, sites 110 and 120 can be independently managed by corresponding DMS instances. In other words, sites 110 and 120 can be under separate administrative domains. Hence, even if subnets 112 and 122 correspond to the same subnet, their devices, such as devices 114 and 124, respectively, are independently managed. Consequently, the layer-2 subnet extension may involve independently configuring parameters associated with the extension at each of sites 110 and 120. Furthermore, the subnet extension process may rely on additional conditions to avoid conflict. However, due to the independent management of sites 110 and 120, a user 140 (e.g., a network administrator) may manually and separately validate these conditions. As a result, the layer-2 subnet extension process can be tedious and error-prone.

To solve this problem, devices in sites 110 and 120 can be managed by EDMS instances 102 and 104, respectively. EDMS instances 102 and 104 can provide independent management domains at sites 110 and 120, respectively. EDMS instances 102 and 104 can include extension systems (ESs) 152 and 154, respectively, for facilitating the efficient layer-2 subnet extension. ES 152 can operate, at least in part, on a management application programming interface (API) 172 for facilitating communication with UI 144 and a service manager 174 that manages the services, such as RPC, provided by EDMS instance 102. Service manager 174 may facilitate lifecycle policies for the objects associated with a service and can perform garbage collection. Similarly, ES 154 can operate, at least in part, on a management API 176 for facilitating interactions with the corresponding UI and a service manager 178 that manages the services provided by EDMS instance 104. In some embodiments, APIs 152 and 154 can be REpresentational State Transfer (REST) APIs.

Using service managers 174 and 178 in ESs 152 and 154, respectively, EDMS instances 110 and 120 can issue remote instructions to each other for configuring remote resources and configure local resources in accordance with the remote configurations. Based on the configured resources, EDMS instances 110 and 120 can then establish a connection for facilitating a layer-2 broadcast domain. From either of EDMS instances 102 and 104, layer-2 subnet extension can be provided even when sites 110 and 120 are independently managed. The subsequent monitoring and management of the extension can then be facilitated through either of EDMS instances 102 and 104.

EDMS instances 102 and 104 may run on one or more devices of sites 110 and 120, respectively. Sites 110 and 120 may also include a dedicated device (e.g., a server or appliance) that may host EDMS instances 102 and 104, respectively. User 140 may configure a control channel 106 between EDMS instances 102 and 104. Control channel 106 can be any connection that allows communication between EDMS instances 102 and 104. In other words, control channel 106 can facilitate bi-directional communication with each other over an RC channel. If control channel 106 is based on a secure protocol, the RC channel can be an authenticated RC channel.

Control channel 106 can be established between gateways 118 and 128, which can include connection appliances (e.g., a VM, a physical appliance, a server, or a switch) that can facilitate control channel 106. Examples of a control channel can include, but are not limited to, an IPSec tunnel, an MPLS connection, a VPN connection, and a combination thereof. For example, gateways 118 and 128 can host respective VMs that can establish control channel 106 as a VPN connection over an IPSec tunnel. Hence, the endpoints, which can be the interfaces, of control channel 106 can be virtual VPN interfaces configured at the corresponding VMs hosted by gateways 118 and 128.

EDMS instance 102 can provide a UI 144 that may be accessed from a device 142 reachable via network 130. User 140 may use UI 144 to configure devices 114, 116, and 118. UI 144 can also display operational information (e.g., configured parameters, performance data, etc.) of site 110. Examples of UI 144 can include, but are not limited to, a GUI, a textual interface (e.g., a CLI), a web-based interface, and a combination thereof. Using UI 144, user 140 may instruct EDMS instance 102 to configure subnet 112 at site 110.

For example, user 140 may provide a subnet prefix (e.g., an IP prefix) via UI 144 to configure subnet 112. A DHCP server of EDMS instance 102 can then allocate IP addresses to devices 114 and 116 from a range of IP addresses belonging to subnet 112.

During operation, based on an input from user 140, UI 144 may provide a command to initiate the layer-2 subnet extension from subnet 110 to subnet 120. API 172 can interact with UI 144 to obtain the command. The command can be a request supported by API 172 and generated at UI 144 based on the user's selection of the layer-2 subnet extension from a list of supported operations presented in UI 144. Since the layer-2 subnet extension is facilitated by EDMS instance 102, it can also be referred to as an initiator EDMS instance. On the other hand, EDMS instance 104 can be referred to as a remote EDMS instance. To facilitate the issuance of the command, UI 144 can present a list of remote sites, such as site 120. User 140 may select site 120 for the extension from the list. EDMS instance 102 can then identify remote EDMS instance 104 for initiating the extension process.

ES 152 can then send a query requesting relevant information to ES 154 based on an RPC issued via control channel 106. ES 154 can then check configuration database 158 of site 120 and obtain the requested information. Database 158 can also be referred to as an insight database that stores information associated with the network fabric (not shown in FIG. 1A) deployed at site 120. The information obtained from database 158 can indicate information associated with subnet 122 and an interface that can operate as an endpoint for control channel 106 at site 120. ES 154 can then send a response comprising the requested information.

Upon receiving the response, ES 152 can provide the information to user 140 via UI 144. UI 144 can present the information based on a selectable list showing the subnets at site 120. For example, the list may show the corresponding subnet prefix of subnet 122. User 140 can then issue an extension request by selecting subnet 122 for the extension. Since ES 152 can communicate with ES 154 over control channel 106, an interface associated with control channel 106 at gateway 128 can be selected for establishing the extension. The interface can be selected by user 140 at UI 144 or automatically by ES 152 based on a selection policy (e.g., availability-based, random, or load-based selection).

EDMS instance 102 can then perform a validation operation for the extension based on a set of validation rules to avoid conflict due to the extension. EDMS instance 102 can apply the validation rules based on the configuration information in a configuration database 156 of site 110 and the obtained information from ES 154. Upon determining that the extension request is valid, ES 152 can send an instruction to ES 154 for extending subnet 112 to subnet 122. The instruction can be based on an RPC issued to ES 154 via control channel 106. ES 154 can then configure an interface of control channel 106 (e.g., at gateway 128) via which subnet 112 is to be extended to site 120. The interface can be configured to operate as an endpoint of a data connection 108 over control channel 106.

ES 154 can also update configuration database 158 with the configuration information and notify ES 152, indicating the completion of the configuration. ES 152 can then configure an interface of control channel 106 (e.g., at gateway 118), via which subnet 112 is to be extended from site 110. ES 152 can also update configuration database 156 with the configuration information. Since interfaces at sites 110 and 120 are configured to operate as respective endpoints, the resultant data connection 108 can become operational over control channel 106. Data connection 108 can then start carrying traffic between subnets 110 and 120. In some embodiments, data connection 108 can include a tunnel established based on a tunneling protocol. Examples of a tunneling protocol can include, but are not limited to, VXLAN, GRE, NVGRE, OTV, and Geneve.

Upon establishment of data connection 108 between the interfaces, the layer-2 data traffic of the extended subnets can be forwarded across data connection 108 as if devices 114, 116, 124, and 126 belong to the same broadcast domain (e.g., the same VLAN). This allows devices 114 and 116 of subnet 110 to communicate with devices 124 and 126 of subnet 120 as if they belong to the same broadcast domain. In this way, EDMS instances 102 and 104 can use RPCs over the pre-existing control channel 106 between gateways 118 and 128 to query each other's configuration databases 158 and 156, respectively, to establish data connection 108 for facilitating layer-2 subnet extension from a single site 110 with automatic validation.

Validation

Figure 1B:
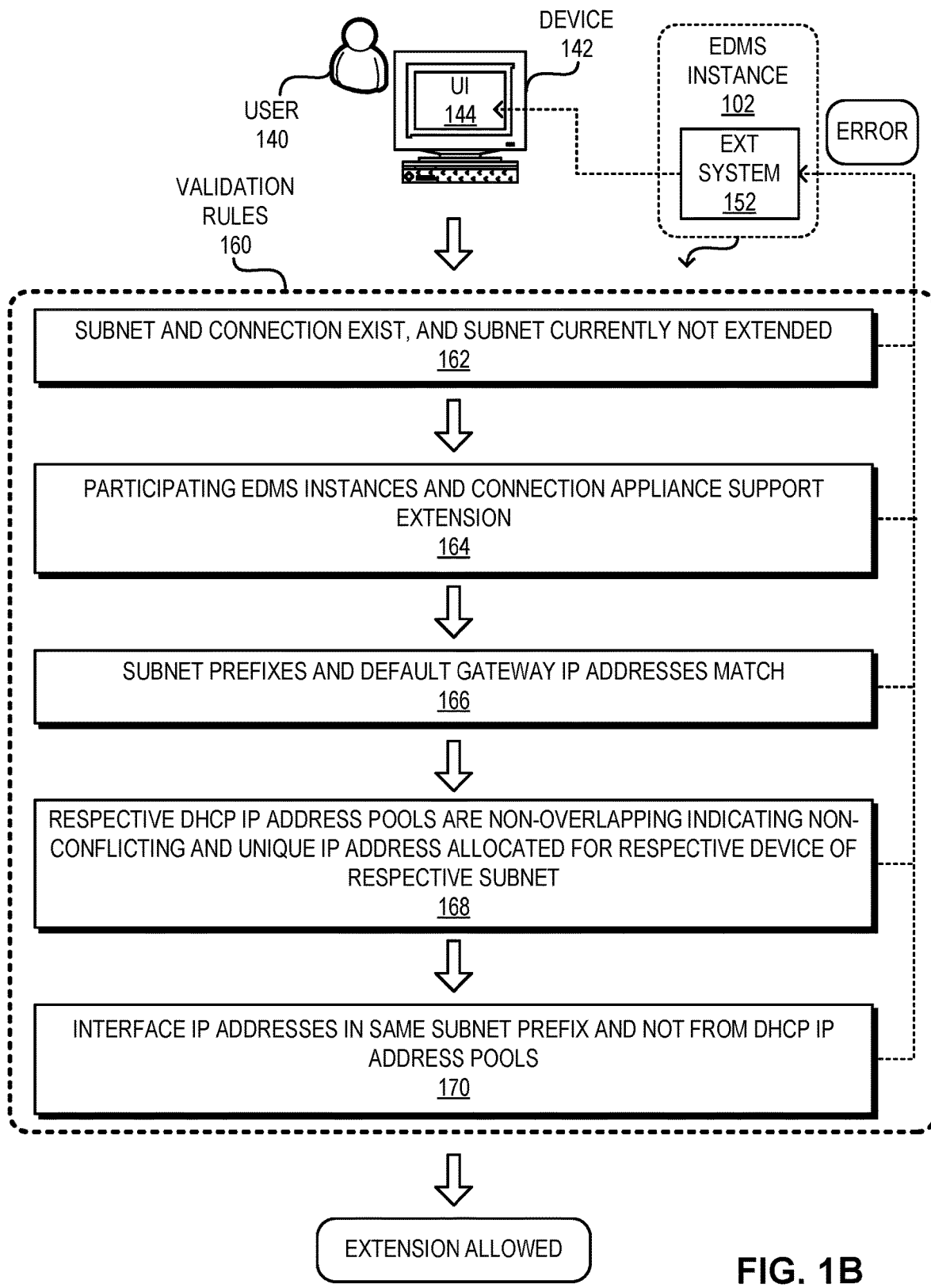
FIG. 1B illustrates an exemplary validation process for facilitating efficient layer-2 extension for independently-managed subnets, in accordance with an embodiment of the present application.

FIG. 1B illustrates an exemplary validation process for facilitating efficient layer-2 extension for independently-managed subnets, in accordance with an embodiment of the present application. Prior to initiating the extension layer-2 extension operation, EDMS instance 102 can then perform a validation operation for the extension based on a set of validation rules 160. The validation can determine whether, upon establishing the layer-2 extension, the resultant unified layer-2 broadcast domain includes a conflict causing an error. During operation, EDMS instance 102 can perform a basic validation. To do so, EDMS instance 102 can ensure that the subnet for which the extension is requested and the control connection exist, and the subnet is currently not extended (rule 162).

EDMS instance 102 can also perform dependency checks by ensuring that the participating EDMS instances and the connection appliance support the extension (rule 164). Furthermore, EDMS instance 102 can perform compatibility checks by ensuring that the subnet prefixes and the default gateway IP addresses match (rule 166). This rule ensures that the subnets at different sites are the "same" subnet. EDMS instance 102 can further ensure that the respective DHCP IP address pools for the extended subnets are non-overlapping. The non-overlapping DHCP IP address pools can indicate that a respective device in the extended subnets is assigned a non-conflicting and unique IP address (rule 168).

In addition, EDMS instance 102 can perform connectivity checks by ensuring that the interface IP addresses (i.e., the IP addresses of the interfaces of the control channel) are in the same subnet prefix and not from the DHCP IP address pools (rule 170). The interface IP addresses being in the subnet prefix indicates that the interfaces can remain in the same subnet. Furthermore, the exclusion from the DHCP IP address pools can indicate that the interface IP addresses remain persistent and may not be allocated to other devices in the subnet.

If rules 160 are satisfied by the validation process, EDMS instance 102 can determine that the extension is allowed. EDMS instance 102 can then perform the subsequent operations that may facilitate the layer-2 subnet extension.

On the other hand, EDMS instance 102 determines non-compliance with any of the rules in rules 160, EDMS instance 102 can determine an error (denoted with a dotted arrow) indicating the non-compliant rule and provide the error to ES 152. ES 152 may present the error on UI 144 in a user-readable format and display the configuration parameters that caused the error. For example, if the DHCP IP address pools are overlapping, UI 144 can state the error (e.g., "overlapping DHCP IP address pools") and the DHCP IP address pool of a respective subnet.

Efficient Layer-2 Subnet Extension

Figure 2A:
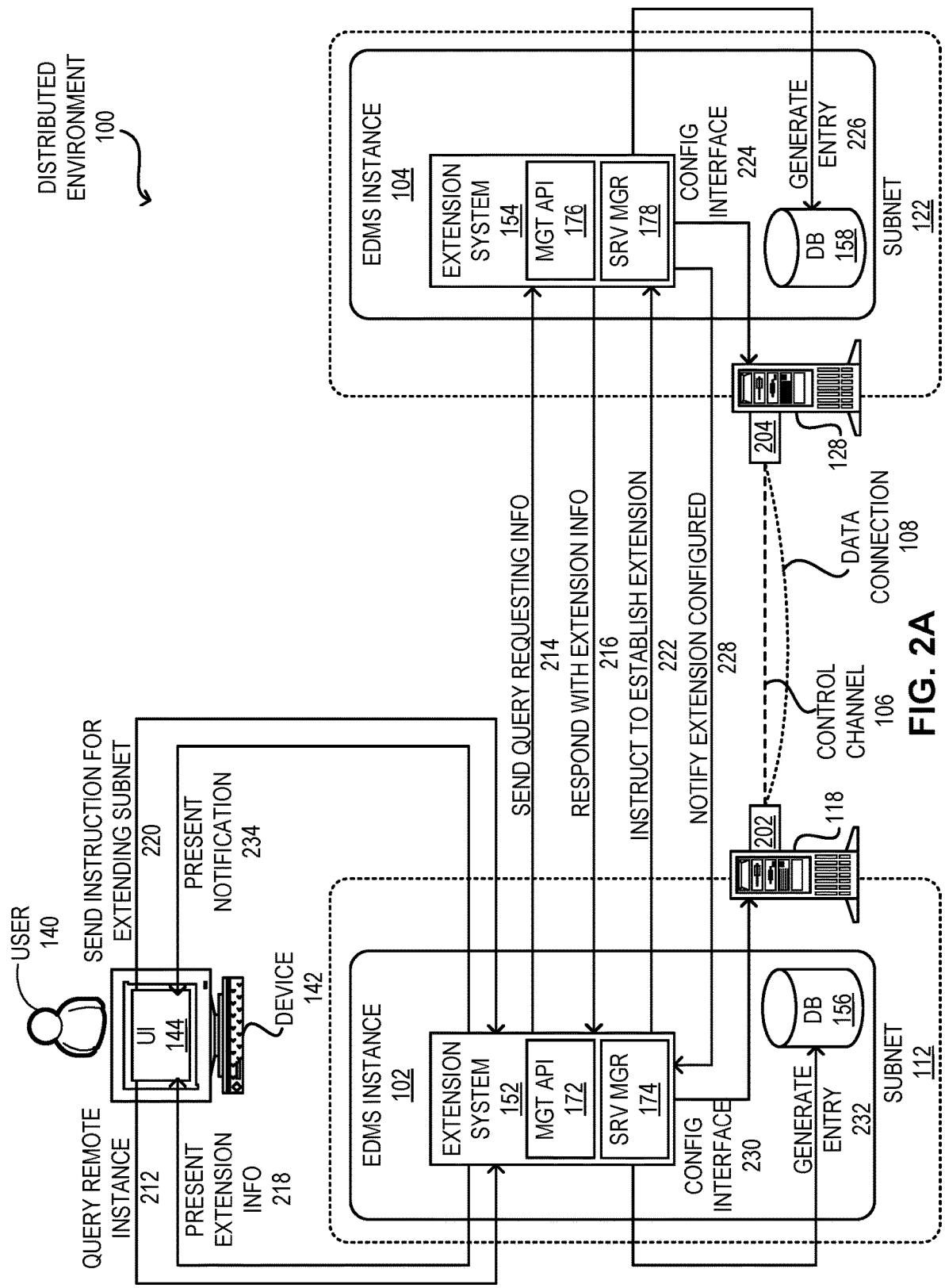
FIG. 2A illustrates an exemplary process of establishing layer-2 extension for independently-managed subnets, in accordance with an embodiment of the present application.

FIG. 2A illustrates an exemplary process of establishing layer-2 extension for independently-managed subnets, in accordance with an embodiment of the present application. During operation, user 140 may initiate the subnet extension process from device 142 using UI 144. User 140 may provide a textual command that initiates the process or may select the corresponding operation from a set of operations presented in UI 144 (e.g., as a drop-down menu). UI 144 can then generate an instruction for ES 152 for sending a query to the remote instance (e.g., based on a request supported by API 172) (operation 212). Upon receiving the instruction, ES 152 may use service manager 174 to send the query to service manager 178 of ES 104 using RPC over control channel 106 (operation 214). The query can request extension information associated with extending subnet 112 to subnet 122 from ES 154. The extension information can include network configuration information of site 120.

ES 154 can then respond with the corresponding extension information to ES 152 over control channel 106 (operation 216). ES 154 may also use service manager 178 to issue RPC for a respective response. Extension information can include network configuration information, such as the respective prefixes of the subnets, which can be the identifying information of the subnets, under the management of EDMS instance 104 and the identifying information of a respective interface operating as an endpoint for a control channel. Upon receiving the extension information, ES 152 can present the received extension information on UI 144 (operation 218).

ES 152 may also present local extension information associated with the identifying information (e.g., respective subnet prefixes) of the subnets under the management of EDMS instance 102 and the identifying information of a respective local interface (e.g., an endpoint or interface identifier) operating as an endpoint for a control channel. In the example in FIG. 2A, the received extension information can include subnet 122 and an interface 204 operating as an endpoint for control channel 106 in subnet 122. Furthermore, the local extension information can include subnet 112 and an interface 202 operating as an endpoint for control channel 106 in subnet 112.

The local and remote extension information can be presented as respective selectable lists of the subnets and connections under the management of EDMS instances 102 and 104. Here, the extension information can be presented on UI 144 as the response to the initiation from user 140 without notifying user 140 regarding the retrieval of the extension information from the remote EDMS instance. User 140 can then initiate the subnet extension process for a subnet pair from the respective lists of subnets and for an interface pair from the respective lists of interfaces presented on UI 144.

UI 144 can then generate an instruction for ES 152 for sending an instruction for extending the local selected subnet to the remote selected subnet over the connection associated with the selected interfaces (operation 220). Here, the instruction can include identifying information of the selected interfaces, which can instruct ES 152 that the extension should be established using the selected interfaces. Since the selected interface pair can be uniquely associated with the corresponding connection, ES 152 can identify the connection for the extension from the selected interface. Accordingly, if user 140 selects subnets 112 and 122, and interfaces 202 and 204, UI 144 can then generate the instruction for ES 152 for sending an instruction for extending subnet 112 to subnet 122 via interfaces 202 and 204.

ES 152 can then send an instruction to ES 154 for establishing the extension using an RPC over control channel 106 (operation 222). The instruction can indicate that subnet 112 should be extended to subnet 122 via interfaces 202 and 204. In response to the RPC, ES 154 can configure interface 204 for establishing data connection 108 over control channel 106 (operation 224). Interfaces 202 and 204 can then be considered as data interfaces. ES 154 can then store the updated configuration information by generating a corresponding entry in configuration database 158 (operation 226). The entry can indicate that subnets 112 and 122 have been extended. Subsequently, ES 154 may notify ES 152 indicating that the extension is configured over control channel 106 (operation 228).

Upon receiving the notification, ES 152 can configure interface 202 for establishing data connection 108 over control channel 106 (operation 230). ES 152 can store the updated configuration information by generating a corresponding entry in configuration database 156 (operation 232). The entry can indicate that subnets 112 and 122 have been extended. Since both interfaces 202 and 204 are configured, the resultant data connection 108 can then become operational over control channel 106. Subsequently, ES 152 can present an "extension established" notification on UI 144 (operation 218). The notification can indicate that a layer-2 subnet extension has been established from subnet 112 to subnet 122 over control channel 106. In this way, EDMS instance 102 can allow user 140 to extend subnet 112 to subnet 122 from a single site.

Figure 2B:
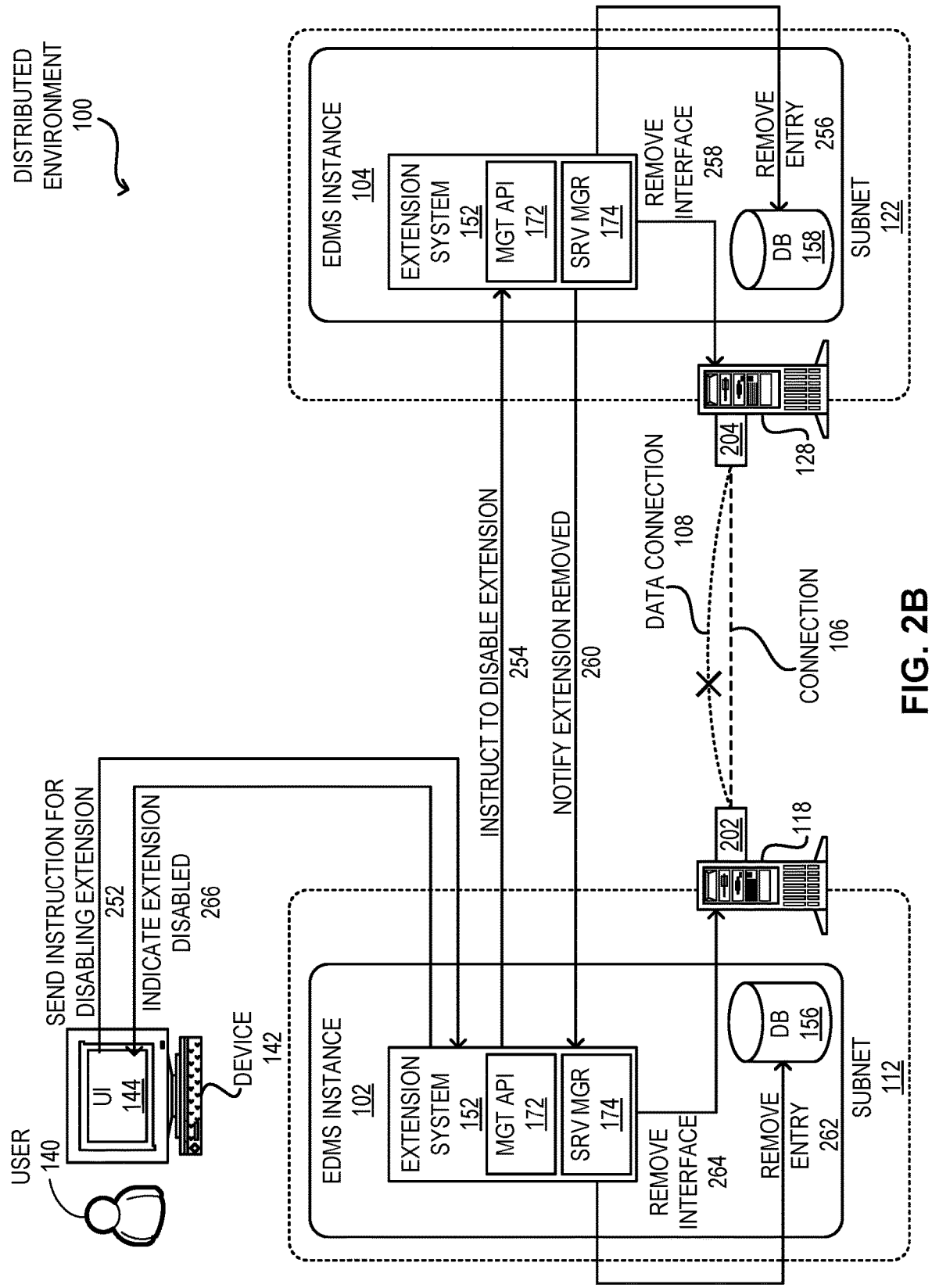
FIG. 2B illustrates an exemplary process of disabling layer-2 extension for independently-managed subnets, in accordance with an embodiment of the present application.

FIG. 2B illustrates an exemplary process of disabling layer-2 extension for independently-managed subnets, in accordance with an embodiment of the present application. During operation, user 140 may issue a command to disable the extension of subnet 112 to subnet 122. To do so, user 140 may issue a textual command that initiates the process or may select the corresponding operation from a set of operations presented in UI 144 (e.g., as a drop-down menu). For example, user 140 may select extended subnets 112 and 122 from a selectable list on UI 144 and issue an instruction to disable the extension. UI 144 can then generate an instruction for ES 152 for sending an instruction for disabling the extension for subnets 112 and 122 (operation 252).

Since the layer-2 subnet extension is provided over data connection 108, ES 152 may identify interfaces 202 and 204 associated with the extension. ES 152 can then send an instruction to ES 154 for disabling the extension using an RPC over control channel 106 (operation 254). The instruction can indicate that the extension of subnet 112 to subnet 122 via interfaces 202 and 204 should be disabled. In response to the RPC, ES 154 can remove the configuration information associated with data connection 108 for interface 204 by removing the corresponding entry from configuration database 158 (operation 256). ES 154 can then configure interface 204 for disabling data connection 108 over control channel 106 (operation 258).

Subsequently, ES 154 may notify ES 152 indicating that the extension is disabled over control channel 106 (operation 260). Upon receiving the notification, ES 154 can remove the configuration information associated with data connection 108 for interface 202 by removing the corresponding entry from configuration database 156 (operation 262). ES 154 can then configure interface 204 for disabling data connection 108 over control channel 106 (operation 264). Since both interfaces 202 and 204 are configured, data connection 108 can then become disabled over control channel 106 (denoted with a cross). Subsequently, ES 152 can present an "extension disabled" notification on UI 144 (operation 218). The notification can indicate that the layer-2 extension for subnets 112 and 122 is disabled. In this way, EDMS instance 102 can allow user 140 to disable layer-2 subnet extension from a single site.

Figure 3A:
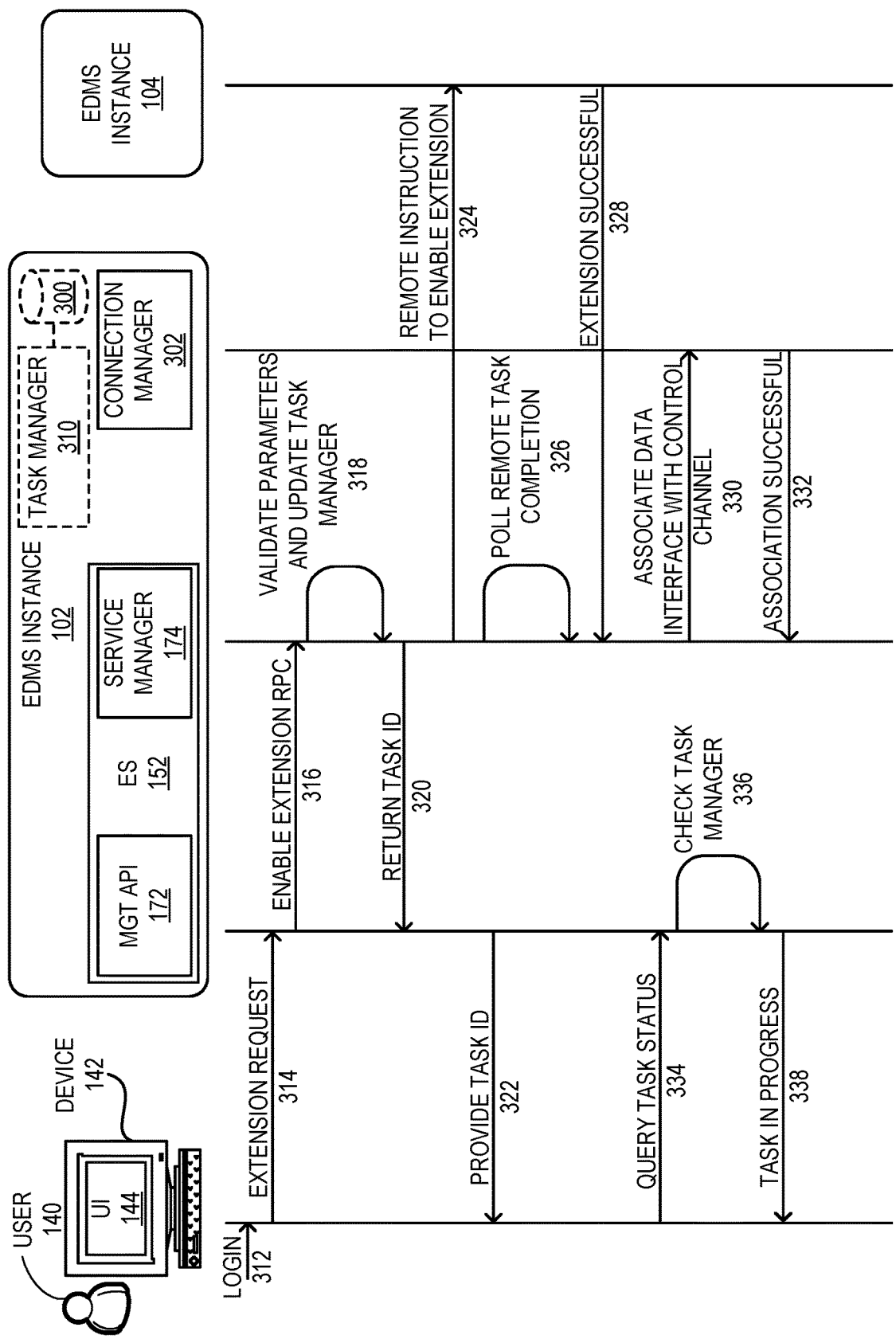
FIG. 3A illustrates exemplary initial communications for establishing layer-2 extension for independently-managed subnets, in accordance with an embodiment of the present application.

FIG. 3A illustrates exemplary initial communications for establishing layer-2 extension for independently-managed subnets, in accordance with an embodiment of the present application. During operation, user 140 can log into a management portal of EDMS instance 102 from UI 144 (operation 312). Based on an input from user 140, UI 144 can send an extension request to ES 152 (operation 314). The request can be a function call to API 172. Hence, API 172 can support a function call that allows EDMS instance 102 to establish and terminate layer-2 subnet extension from a single site. In response, API 172 may send the call to service manager 174 (e.g., an asynchronous API call) (operation 316). Service manager 174 can then validate the parameters associated with the API call (operation 318). Upon validation, service manager 174 can update task manager 310 of EDMS instance 102 (operation 318).

Task manager 310 can be responsible for initiating and terminating a respective task associated with service manager 174. Accordingly, task manager 310 can create the task of layer-2 subnet extension and generate a task identifier (e.g., universally unique identifier (UUID)). Service manager 174 can then return the task identifier associated with the task to API 172 (operation 320). API 172 can use the task identifier to query task manager 310 regarding the progress of the extension process. API 172 can provide the task identifier to UI 144 (operation 322). The task identifier can allow UI 144 to issue subsequent queries regarding the progress of the extension process. Service manager 174 can send a remote instruction (e.g., an RPC) to enable the extension to EDMS instance 104 (operation 324).

EDMS instance 104 can also update the local task manager to initiate a task at the remote site and obtain a corresponding task identifier. This task can be a remote task from the perspective of EDMS instance 102. Service manager 174 can poll for the remote task's completion (e.g., send successive requests for checking the status of the remote task) (operation 326). EDMS instance 104 can configure a data interface for a data connection at the gateway of the remote site and update the configuration database of the remote site to indicate that the subnets have been extended, as described in conjunction with FIG. 2A. The remote task can then be completed.

Upon completion, EDMS instance 104 can notify service manager 174, indicating that the extension is successful at EDMS instance 104 (operation 328). The notification may also include the task identifier of the remote task. Service manager 174 can then determine that the remote task is complete. Subsequently, service manager 174 can configure a data interface for the data connection, which can be a virtual network interface card (VNIC) for a VXLAN connection. Service manager 174 can associate the data interface with the control channel to a connection manager 302 of EDMS instance 102 (operation 330). For example, if the control channel is a VPN provided by a VM, connection manager 302 can then be a VM manager that may add the VNIC to the VPN VM. The corresponding identifying information can then be the connection identifier of the VPN.

Connection manager 302 can then notify service manager 174 that the association has been successful (operation 332). If UI 144 queries the task status using the task identifier (operation 334), API 172 can check with task manager 310 based on the task identifier (operation 336) and notify UI 144 that the task is in progress (operation 338). Checking with task manager 310 can include looking up the task identifier in a task database 300 of EDMS instance 102. To complete the layer-2 subnet extension process, EDMS instance 102 may perform a set of subsequent operations.

Figure 3B:
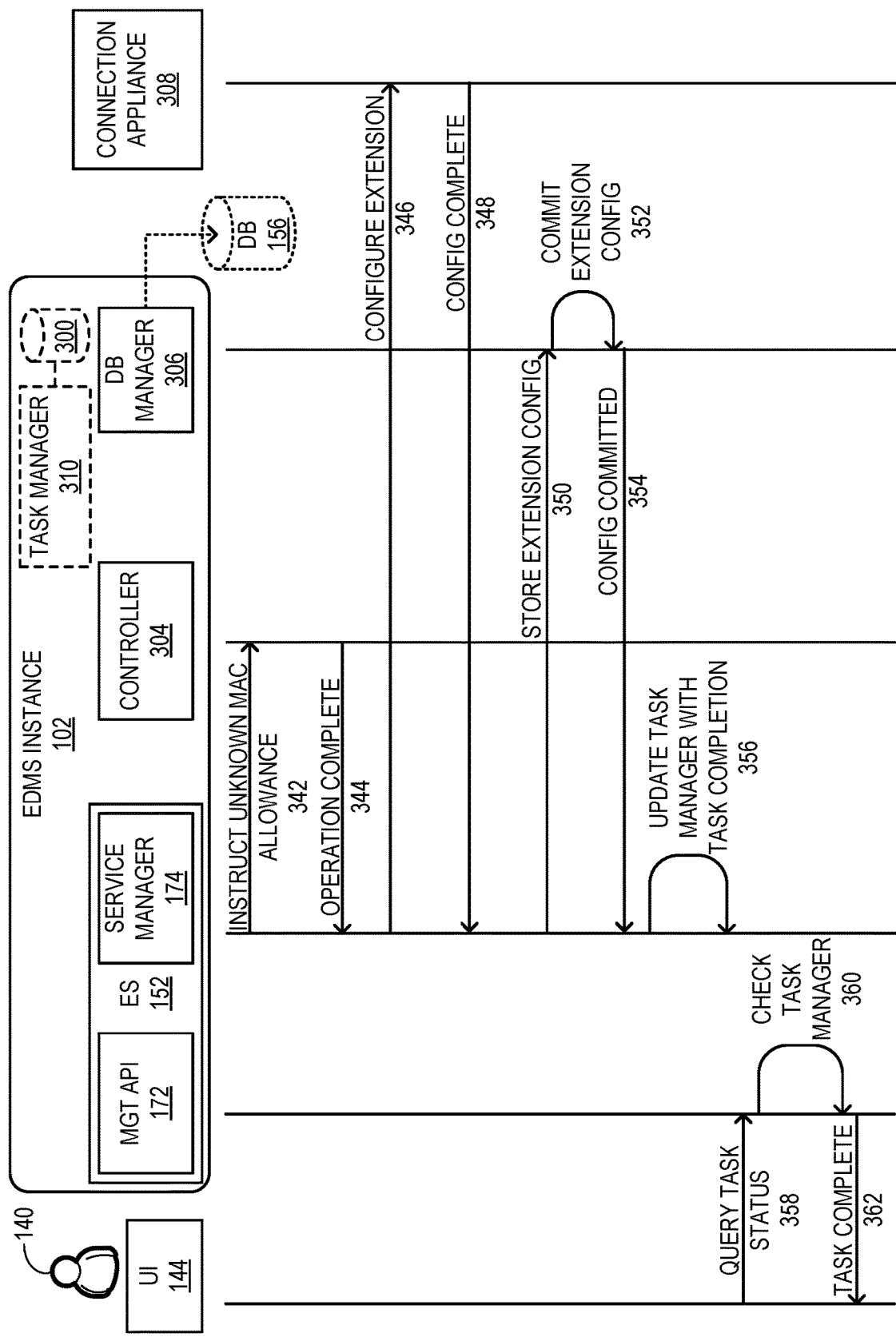
FIG. 3B illustrates subsequent exemplary communications for establishing layer-2 extension for independently-managed subnets, in accordance with an embodiment of the present application.

FIG. 3B illustrates subsequent exemplary communications for establishing layer-2 extension for independently-managed subnets, in accordance with an embodiment of the present application. EDMS instance 102 may support a controller 304 (e.g., a controller of a software-defined network (SDN)). Service manager 174 may instruct controller 304 to allow unknown media access control (MAC) address on the data interface (operation 342). This instruction can ensure that the flow rules provided by controller 304 can accommodate the packets from the remote site. Controller 304 can then notify service manager 174 that the operation is complete (operation 344).

Service manager 174 can also configure the extension at a connection appliance 308 (operation 346). Connection appliance 308 can be a physical or virtual apparatus that can facilitate the endpoints for the control channel between the EDMS instances. For example, if the control channel is established between VMs, connection appliance 308 can be a VM. Configuring the extension can then include configuring the data interface (e.g., a VXLAN interface) with the extension parameters at the VM. Controller 304 can then notify service manager 174 that the configuration is complete (operation 348).

Subsequently, service manager 174 can instruct a database manager 306 of EDMS instance 102 to store the extension configuration (operation 350). Such configuration can include the configuration of the data interface. Database manager 306 can be responsible for maintaining database 156. Database manager 306 can commit the extension configuration in database 156 (operation 352) and notify service manager 174 that the configuration is committed (operation 354).

Figure 4A:
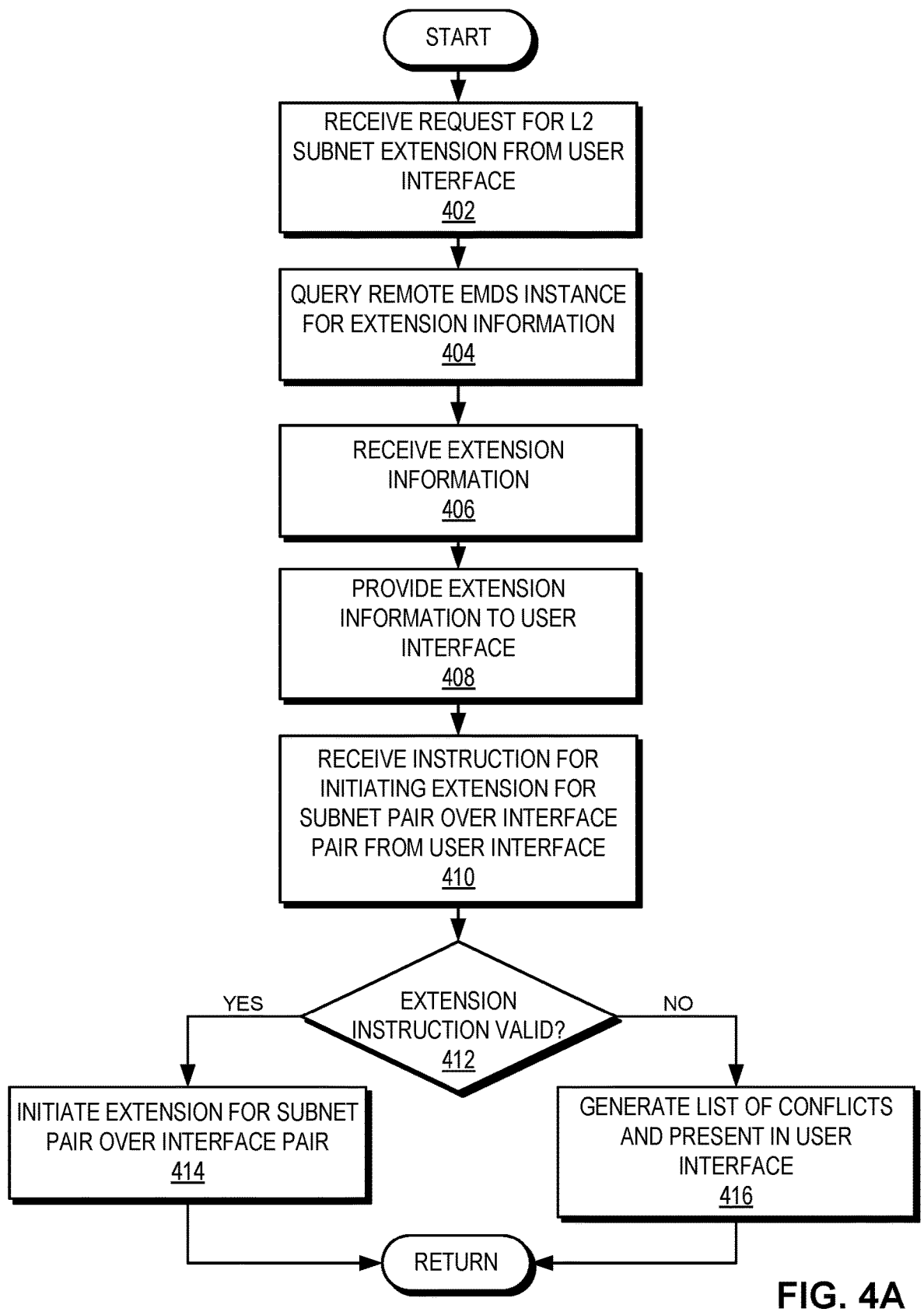
FIG. 4A presents a flowchart illustrating the process of an enhanced device management system (EDMS) instance of a subnet initialing layer-2 extension for independently-managed subnets, in accordance with an embodiment of the present application.

Since the data interfaces at both EDMS instances can complete at this point, service manager 174 can update task manager 310 with task completion (operation 356). To do so, task manager 310 may mark an entry associated with the task in task database 300 as complete. If UI 144 queries the task status using the task identifier (operation 358), API 172 can check with task manager 310 based on the task identifier (operation 360) and notify UI 144 that the task is complete (operation 362). Checking with task manager 310 can include looking up the task identifier in task database 300. Operations FIG. 4A presents a flowchart illustrating the process of an EDMS instance of a subnet initialing layer-2 extension for independently-managed subnets, in accordance with an embodiment of the present application. During operation, the EDMS instance can receive a request for the layer-2 subnet extension from a UI (operation 402). The EDMS instance can then query a remote EDMS instance for extension information (e.g., using RPC) (operation 404) and receive the extension information (operation 406). The extension information can include a respective subnet and a respective endpoint managed by the remote EDMS instance.

The EDMS instance can provide the extension information to the UI (operation 408). The UI can present the extension information in a selectable format. The EDMS instance can receive an instruction for initiating the extension for a subnet pair over an interface pair from the user interface (operation 410). The EDMS instance can then determine whether the extension request is valid (operation 412), as described in conjunction with FIG. 1B. If the extension is valid, the EDMS instance can initiate the extension for the subnet pair over the interface pair (operation 414). On the other hand, if the extension is not valid, the EDMS instance can generate a list of conflicts (e.g., based on the associated validation rules) and present the conflicts in the UI (operation 416).

Figure 4B:
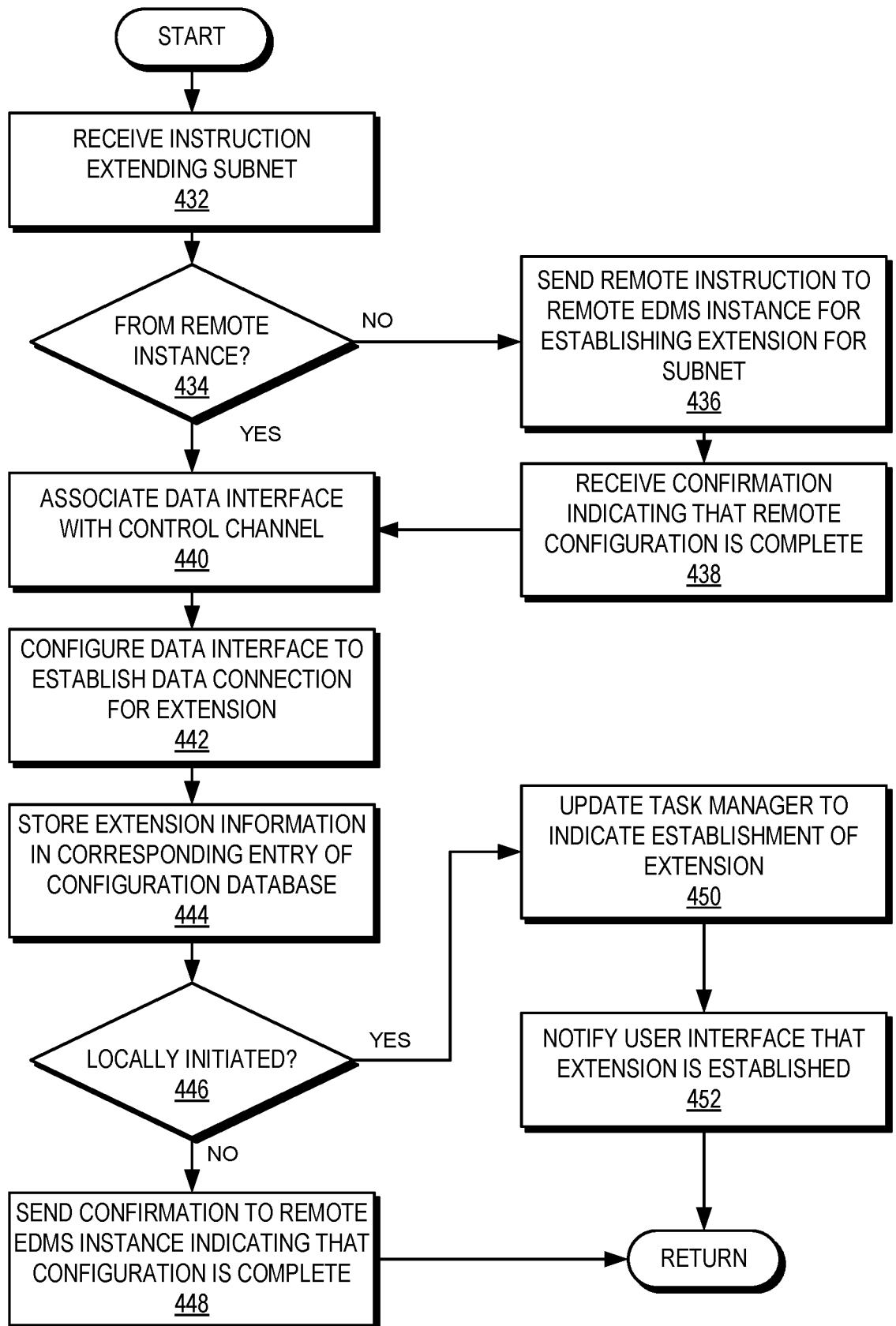
FIG. 4B presents a flowchart illustrating the process of an EDMS instance of a subnet establishing layer-2 extension with a remote subnet managed by a remote EDMS instance, in accordance with an embodiment of the present application.

FIG. 4B presents a flowchart illustrating the process of an EDMS instance of a subnet establishing layer-2 extension with a remote subnet managed by a remote EDMS instance, in accordance with an embodiment of the present application. During operation, the EDMS instance can receive an instruction for extending a subnet (operation 432) and determine whether the instruction is from a remote EDMS instance (operation 434). If the instruction is not from a remote instance, the instruction can be from a local UI. The EDMS instance can then send a remote instruction (e.g., an RPC) to the remote EDMS instance for establishing the extension for the subnet (operation 436) and receive a confirmation indicating that the remote configuration is complete (operation 438).

If the instruction is from a remote instance (operation 434) or upon receiving the confirmation (operation 438), the EDMS instance can associate the data interface with the control channel (operation 440). The EDMS instance can then configure the data interface to establish the data connection for the extension (operation 442). If the data connection is a VXLAN tunnel, the interface can be a VXLAN interface. Subsequently, the EDMS instance can store the extension information, which may include the configuration information of the interface, in the corresponding entry of the local configuration database (operation 444).

The EDMS instance can then determine whether the extension process is locally initiated (operation 446). The extension process can be locally initiated if the user has provided the instruction for the extension at the site of the EDMS instance. If the extension process is not locally initiated, the EDMS instance can send a confirmation to the remote EDMS instance indicating that the configuration is complete (operation 448). On the other hand, if the extension process is locally initiated, the EDMS instance can update the task manager to indicate the establishment of the extension (operation 450) and notify the UI that the extension is established (operation 452).

Figure 4C:
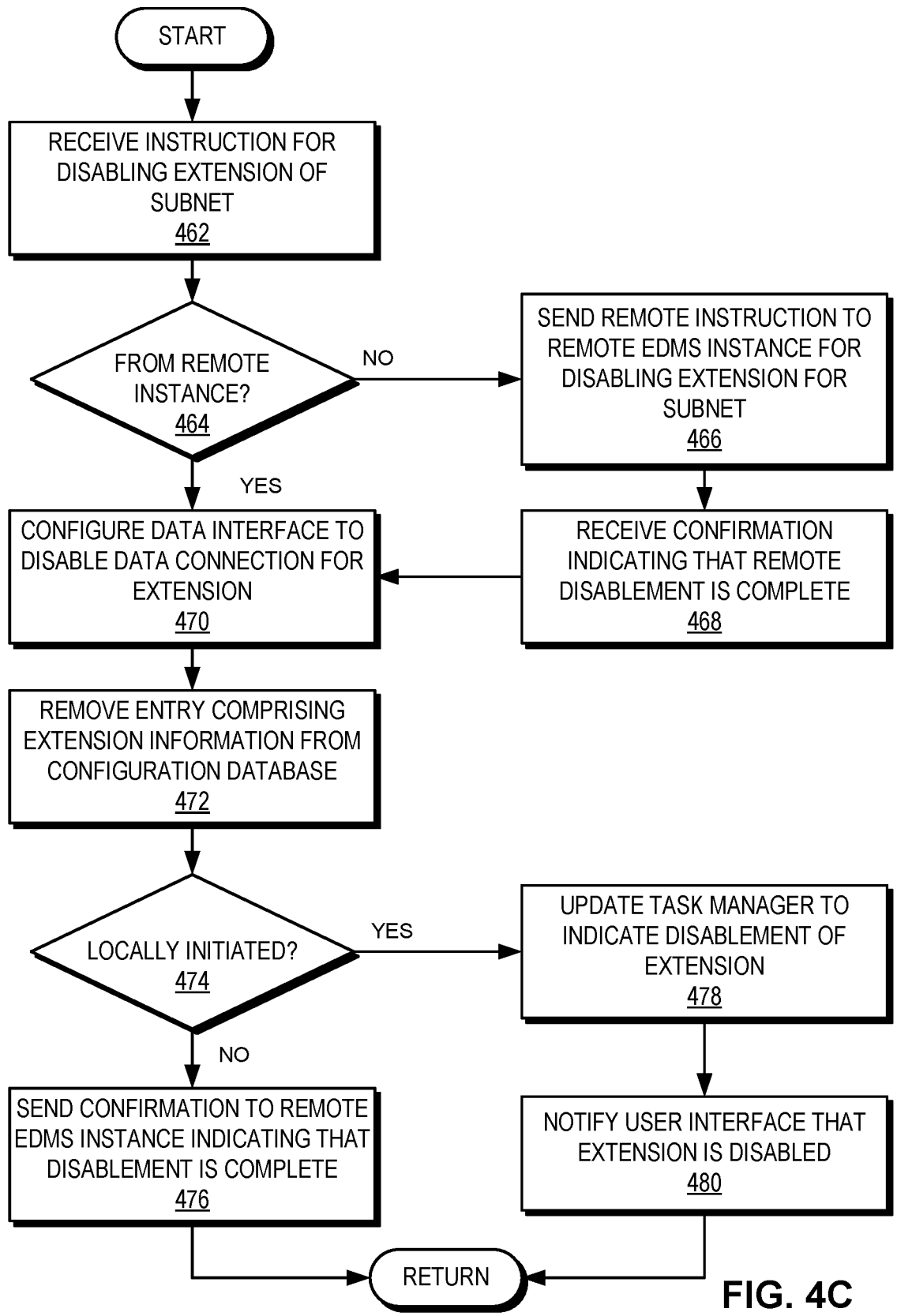
FIG. 4C presents a flowchart illustrating the process of an EDMS instance of a subnet disabling layer-2 extension with a remote subnet managed by a remote EDMS instance, in accordance with an embodiment of the present application.

FIG. 4C presents a flowchart illustrating the process of an EDMS instance of a subnet disabling layer-2 extension with a remote subnet managed by a remote EDMS instance, in accordance with an embodiment of the present application. During operation, the EDMS instance can receive an instruction for disabling the extension of a subnet (operation 462) and determine whether the instruction is from a remote EDMS instance (operation 464). If the instruction is not from a remote instance, the EDMS instance can send a remote instruction to the remote EDMS instance for disabling the extension of the subnet (operation 466) and receive a confirmation indicating that the remote disablement is complete (operation 468).

If the instruction is from a remote instance (operation 464) or upon receiving the confirmation (operation 468), the EDMS instance can configure the data interface to disable the data connection for the extension (operation 470) and remote the entry comprising the extension information from the local configuration database (operation 472). The EDMS instance can then determine whether the extension process is locally initiated (operation 474). If the extension process is not locally initiated, the EDMS instance can send a confirmation to the remote EDMS instance indicating that the disablement is complete (operation 476). On the other hand, if the extension process is locally initiated, the EDMS instance can update the task manager to indicate the disablement of the extension (operation 478) and notify the UI that the extension is disabled (operation 480).

Figure 5A:
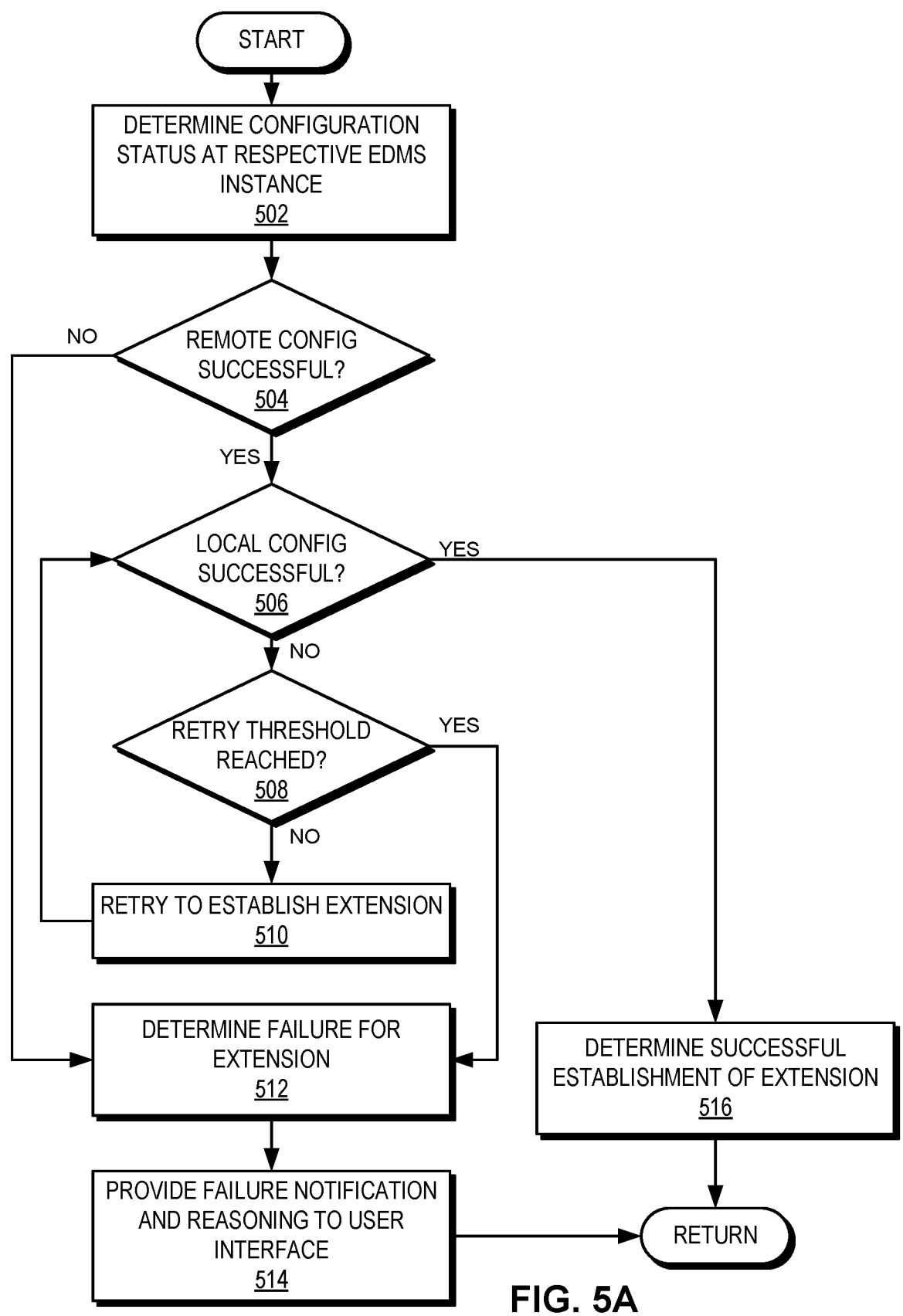
FIG. 5A presents a flowchart illustrating the process of an EDMS instance responding to a failure associated with layer-2 subnet extension, in accordance with an embodiment of the present application.

FIG. 5A presents a flowchart illustrating the process of an EDMS instance responding to a failure associated with layer-2 subnet extension, in accordance with an embodiment of the present application. During operation, the EDMS instance can determine the configuration status of a respective EDMS instance (operation 502) and determine whether the remote configuration is successful (operation 502). If the remote configuration is successful, the EDMS instance can determine whether the local configuration is successful (operation 506). If both local and remote configurations are successful (operations 504 and 506), the EDMS instance can determine the successful establishment of the extension (operation 516).

On the other hand, if the remote configuration is successful, but the local configuration is not successful (operations 504 and 506), the EDMS instance can determine whether a retry threshold has reached (operation 508). The retry threshold can indicate the maximum number of times that the EDMS instance may attempt to successfully configure the extension. If the retry threshold is significantly large (e.g., unbounded), the user can be expected to intervene and manually terminate the extension process.

If the retry threshold has not been reached, the EDMS instance can retry to establish the extension (operation 510) and determine whether the local configuration is successful (operation 506). If the retry threshold has reached (operation 508) or the remote configuration is not successful (operation 504), the EDMS instance can determine a failure for the extension (operation 512). The EDMS instance may also provide a failure notification and the reasoning for failure to the UI (operation 514).

Figure 5B:
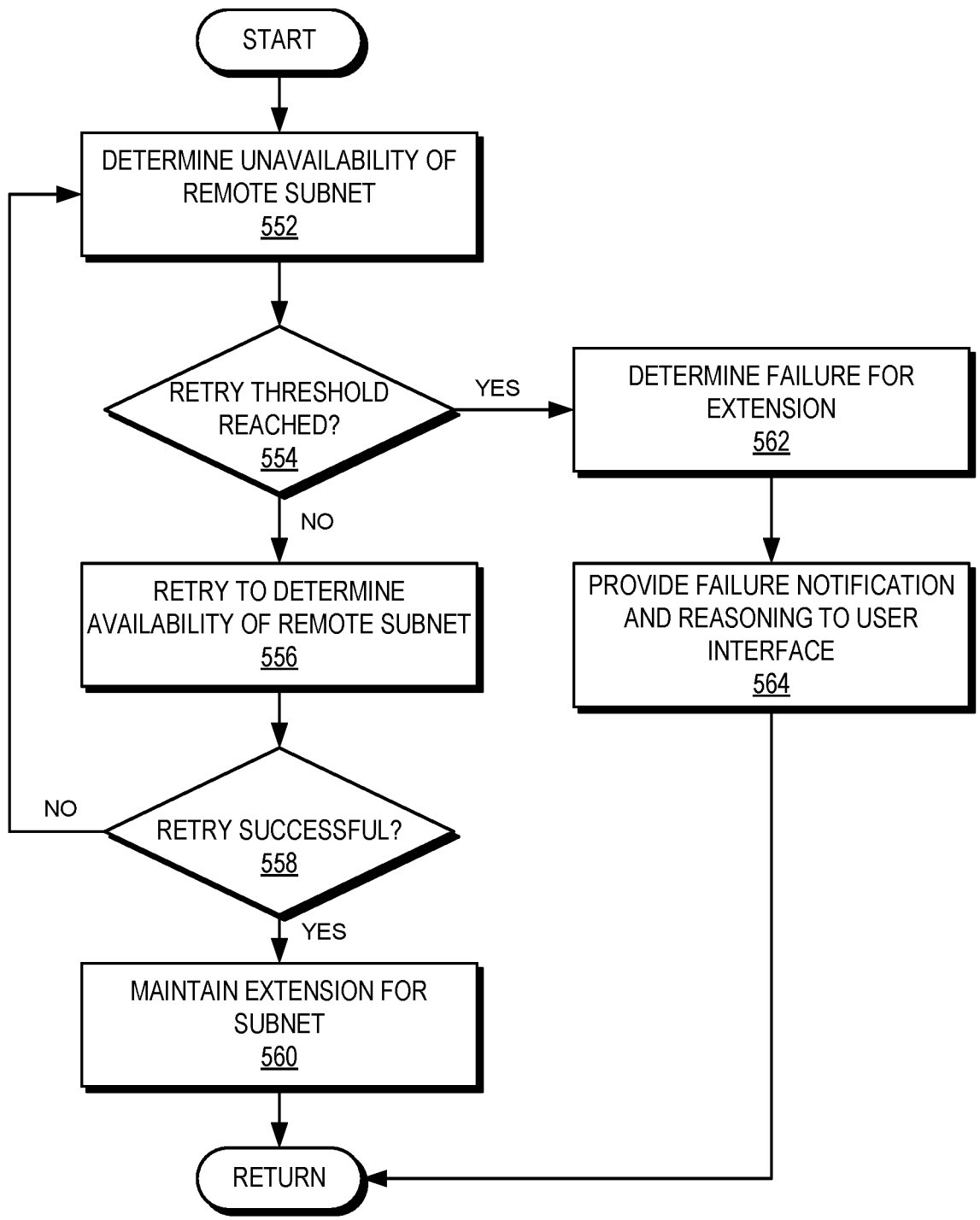
FIG. 5B presents a flowchart illustrating the process of an EDMS instance responding to unavailability associated with layer-2 subnet extension, in accordance with an embodiment of the present application.

FIG. 5B presents a flowchart illustrating the process of an EDMS instance responding to unavailability associated with layer-2 subnet extension, in accordance with an embodiment of the present application. During operation, the EDMS instance may determine the unavailability of the remote subnet (operation 552). The unavailability can be caused by a failure in the connection to the remote subnet or at the remote gateway. The EDMS instance can then determine whether a retry threshold has reached (operation 554). The retry threshold can indicate the maximum number of times that the EDMS instance may attempt to determine the availability of the remote subnet.

If the retry threshold has not been reached, the EDMS instance can retry to determine the availability of the remote subnet (operation 556) and determine whether the retry operation is successful (operation 558). If the retry operation is not successful, the EDMS instance can continue to determine the unavailability of the remote subnet (operation 552). On the other hand, if the retry operation is successful, the EDMS instance can maintain the extension for the subnet (operation 560). If the retry threshold has reached, the EDMS instance can determine a failure for the extension (operation 562) and may provide a failure notification and the reasoning for failure to the UI (operation 564).

Exemplary Computer System and Apparatus

Figure 6:
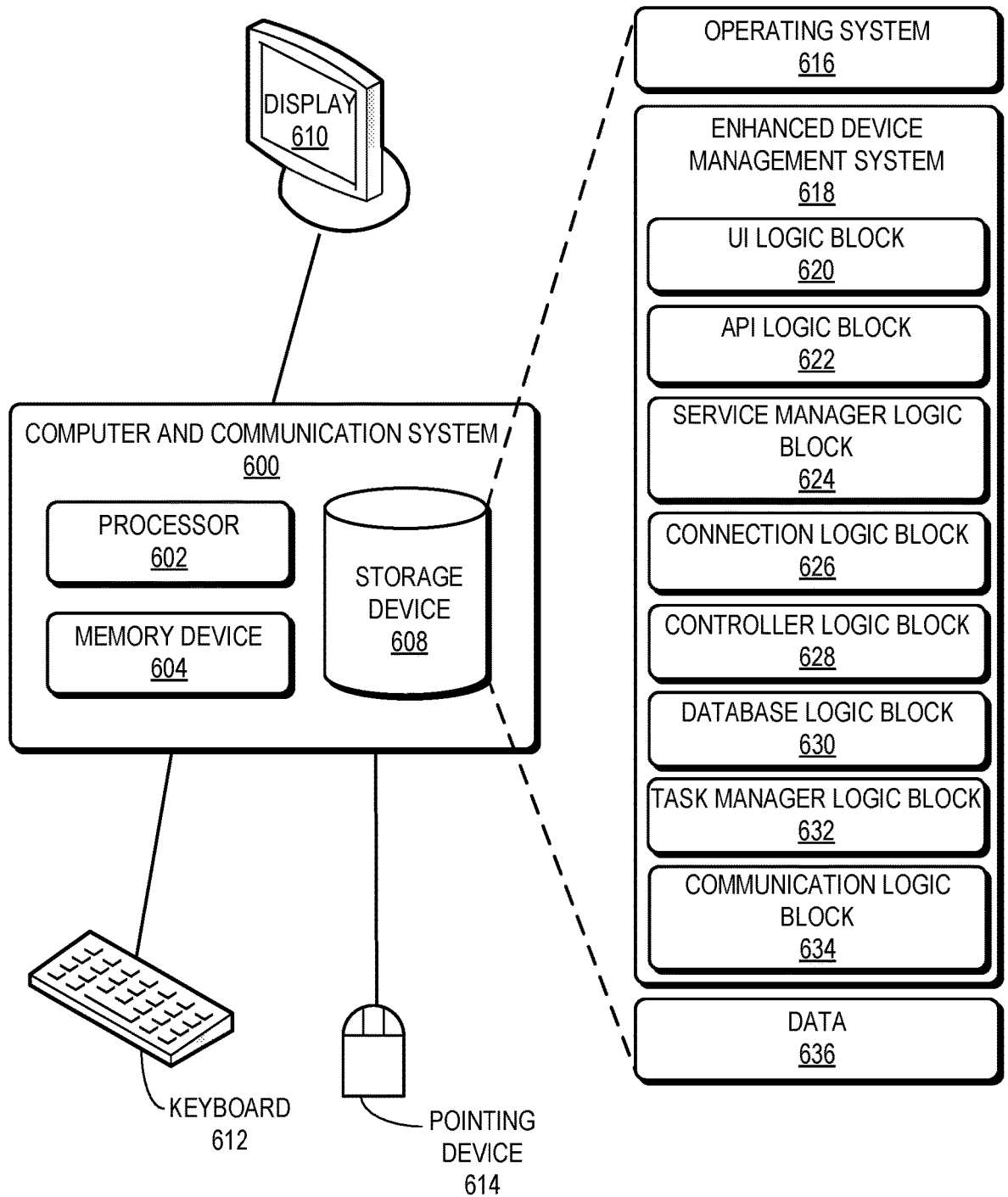
FIG. 6 illustrates an exemplary computer system that facilitates an EDMS providing efficient layer-2 extension for independently-managed subnets, in accordance with an embodiment of the present application.

FIG. 6 illustrates an exemplary computer system that facilitates an EDMS providing efficient layer-2 extension for independently-managed subnets, in accordance with an embodiment of the present application. Computer and communication system 600 includes a processor 602, a memory device 604, and a storage device 608. Memory device 604 can include volatile memory (e.g., a dual in-line memory module (DIMM)). Furthermore, computer and communication system 600 can be coupled to a display device 610, which can be capable of receiving an input (e.g., a touch screen), a keyboard 612, and a pointing device 614. Storage device 608 can store an operating system 616, an enhanced device management system (EDMS) 618, and data 636. EDMS 618 can facilitate the operations of EDMS instance 102. It should be noted that, depending on the operations executed on a specific device, an instance of EDMS 618 may include a subset of the logic blocks on that device.

EDMS 618 can include instructions, which when executed by computer and communication system 600, can cause computer and communication system 600 to perform methods and/or processes described in this disclosure. Specifically, EDMS 618 can include instructions for providing a UI from which a user may issue instructions to initiate, establish, and disable layer-2 extension of independently managed subnets from a single site (UI logic block 620). Furthermore, EDMS 618 can include instructions for providing a management API (e.g., API 172) (API logic block 622). EDMS 618 can also include instructions for supporting API function calls for initiating, establishing, and disabling layer-2 extension of independently managed subnets from a single site (API logic block 622).

In addition, EDMS 618 can include instructions for operating a service manager (e.g., service manager 174) that can issue RPCs to a remote service manager, initiate configuration of a data interface for subnet extension, and facilitate update to a local configuration database (service manager logic block 624). Furthermore, EDMS 618 can include instructions for configuring a data interface and associating the data interface with a control channel (connection logic block 626). EDMS 618 can also include instructions for operating a connection appliance that can operate as an endpoint of a connection (e.g., a VM operating as an endpoint of a VPN connection) (connection logic block 626).

In some embodiments, EDMS 618 includes instructions for operating a controller that can issue a flow rule allowing flows of unknown MAC addresses (controller logic block 628). Moreover, EDMS 618 can include instructions for operating a database manager that can update a configuration database with information associated with subnet extension (database logic block 630). EDMS 618 can also include instructions for operating a task manager that can facilitate a task identifier and update a task database (task manager logic block 632).

EDMS 618 can also include instructions for sending and receiving RPCs, VPN packets, tunnel-encapsulated packets, and other layer-2 and/or layer-3 packets (communication logic block 634). Data 636 can include any data that is required as input or that is generated as output by the methods and/or processes described in this disclosure. Specifically, data 636 can include information in a configuration database and a task database.

Figure 7:
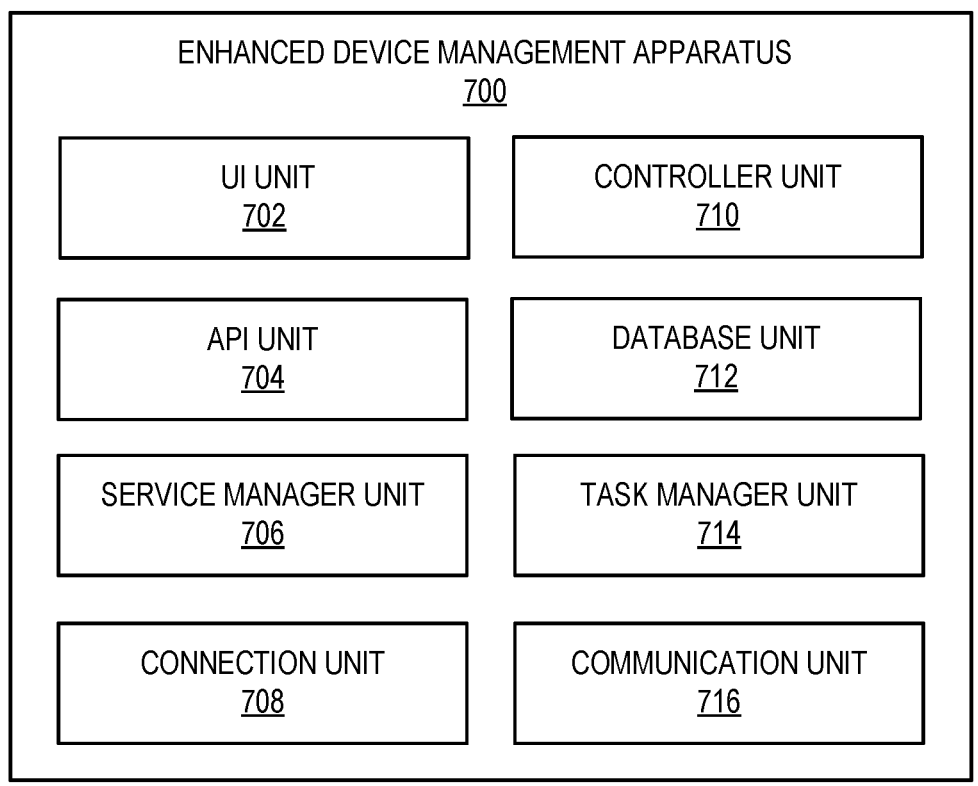
FIG. 7 illustrates an exemplary apparatus that facilitates an EDMS providing efficient layer-2 extension for independently-managed subnets, in accordance with an embodiment of the present application.

FIG. 7 illustrates an exemplary apparatus that facilitates an EDMS providing efficient layer-2 extension for independently-managed subnets, in accordance with an embodiment of the present application. Enhanced device management apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device which is capable of communicating with other computer systems and/or devices. Apparatus 700 may also be a network device (e.g., a switch, a router, etc.).

Specifically, apparatus 700 can comprise units 702-716, which perform functions or operations similar to logic blocks 620-634 of computer and communication system 600 of FIG. 6, including: a UI unit 702; an API unit 704; a service manager unit 706; a connection unit 708; a controller unit 710; a database unit 712, a task manager unit 714; and a communication unit 716.

Note that the above-mentioned logic blocks and modules can be implemented in hardware as well as in software. In one embodiment, these logic blocks and modules can be embodied in computer-executable instructions stored in a memory which is coupled to one or more processors in computer and communication system 600 and/or apparatus 700. When executed, these instructions cause the processor(s) to perform the aforementioned functions.

In summary, embodiments of the present invention provide a system and a method for facilitating efficient layer-2 subnet extension. During operation, the system can query, from a first administrative domain, a remote database of a second administrative domain for network configuration information. The network configuration information can include identifying information of one or more remote network segments configured under the second administrative domain. The system can obtain, from a user interface of the first administrative domain, an instruction for performing layer-2 subnet extension from a first network segment under the first administrative domain to a second network segment of the one or more remote network segments. The extension can provide a common layer-2 broadcast domain comprising the first and second network segments. The system can then send a remote instruction executable in the second administrative domain for configuring a remote endpoint in the second network segment for the extension. The system can also configure a local endpoint in the first network segment for the extension. Subsequently, the system can establish a data connection between the local and remote endpoints for the extension.

The methods and processes described herein can be embodied as code and/or data, which can be stored in a non-transitory computer-readable storage medium. When a computer system reads and executes the code and/or data stored on the non-transitory computer-readable storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed.

When the hardware modules or apparatus are activated, they perform the methods and processes included within them.

The foregoing descriptions of embodiments of the present invention have been presented only for purposes of illustration and description.

They are not intended to be exhaustive or to limit this disclosure. Accordingly, many modifications and variations will be apparent to practitioners skilled in the art. The scope of the present invention is defined by the appended claims.

What is claimed is:

1. A method for facilitating efficient layer-2 subnet extension, comprising:
    sending, from a first administrative domain, a query to a remote database of a second administrative domain for network configuration information using a remote procedure call (RPC) over a control channel coupling the first and second administrative domains, wherein the network configuration information comprises identifying information of one or more remote network segments configured under the second administrative domain;
    receiving, at the first administrative domain, a response comprising the network configuration information from the remote database;
    obtaining, from a user interface of the first administrative domain, an instruction for performing layer-2 subnet extension based on the network configuration information, wherein the extension is from a first network segment under the first administrative domain to a second network segment of the one or more remote network segments, wherein the extension provides a common layer-2 broadcast domain comprising the first and second network segments;
    sending, from the first administrative domain to the second administrative domain, a remote instruction executable in the second administrative domain for configuring a remote endpoint in the second network segment for the extension;
    configuring a local endpoint in the first network segment for the extension; and
    establishing a data connection between the local and remote endpoints for the extension.

2. The method of claim 1, wherein the network configuration information further comprises identifying information of a respective endpoint available for extension under the second administrative domain; and
    wherein the instruction for performing the extension further comprises identifying information of the remote endpoint.

3. The method of claim 1, further comprising:
    receiving, via the control channel, a notification indicating that the remote endpoint is configured for the extension; and
    configuring the local endpoint in response to receiving the notification.

4. The method of claim 1, wherein the data connection includes a tunnel between the local and remote endpoints, wherein the tunnel is established over the control channel.

5. The method of claim 1, further comprising storing local configuration information associated with the local endpoint in a local database of the first administrative domain.

6. The method of claim 1, wherein obtaining the instruction for performing the extension further comprises:
    receiving, from the user interface, an application programming interface (API) function call specific to the initiation of the extension; and
    determining the instruction from the API function call.

7. The method of claim 1, further comprising:
    obtaining, from the user interface, a second instruction for disabling the extension;
    sending a second remote instruction executable in the second administrative domain for configuring the remote endpoint for disabling the extension at the remote endpoint; and
    configuring the local endpoint for locally disabling the extension.

8. The method of claim 1, further comprising:
    prior to sending the remote instruction, validating whether the extension can be performed by applying a set of validation rules on the network configuration information; and
    in response to an unsuccessful validation, providing an error notification to the user interface without sending the remote instruction.

9. The method of claim 1, further comprising:
    determining an error associated with the configuration of the local endpoint; and
    retrying to configure the local endpoint for a threshold number of times.

10. A non-transitory computer-readable storage medium storing instructions that when executed by a computer cause the computer to perform a method for facilitating efficient layer-2 subnet extension, the method comprising:
    sending, from a first administrative domain, a query to a remote database of a second administrative domain for network configuration information using a remote procedure call (RPC) over a control channel coupling the first and second administrative domains, wherein the network configuration information comprises identifying information of one or more remote network segments configured under the second administrative domain;
    receiving, at the first administrative domain, a response comprising the network configuration information from the remote database;
    obtaining, from a user interface of the first administrative domain, an instruction for performing layer-2 subnet extension based on the network configuration information, wherein the extension is from a first network segment under the first administrative domain to a second network segment of the one or more remote network segments, wherein the extension provides a common layer-2 broadcast domain comprising the first and second network segments;
    sending, from the first administrative domain to the second administrative domain, a remote instruction executable in the second administrative domain for configuring a remote endpoint in the second network segment for the extension;
    configuring a local endpoint in the first network segment for the extension; and
    establishing a data connection between the local and remote endpoints for the extension.

11. The non-transitory computer-readable storage medium of claim 10, wherein the network configuration information further comprises identifying information of a respective endpoint available for extension under the second administrative domain; and
    wherein the instruction for performing the extension further comprises identifying information of the remote endpoint.

12. The non-transitory computer-readable storage medium of claim 10, wherein the method further comprises:

receiving, via the control channel, a notification indicating that the remote endpoint is configured for the extension; and configuring the local endpoint in response to receiving the notification.

13. The non-transitory computer-readable storage medium of claim 10, wherein the data connection includes a tunnel between the local and remote endpoints, wherein the tunnel is established over the control channel.

14. The non-transitory computer-readable storage medium of claim 10, wherein the method further comprises storing local configuration information associated with the local endpoint in a local database of the first administrative domain.

15. The non-transitory computer-readable storage medium of claim 10, wherein obtaining the instruction for performing the extension further comprises:
   receiving, from the user interface, an application programming interface (API) function call specific to the initiation of the extension; and
   determining the instruction from the API function call.

16. The non-transitory computer-readable storage medium of claim 10, wherein the method further comprises:
   obtaining, from the user interface, a second instruction for disabling the extension;
   sending a second remote instruction executable in the second administrative domain for configuring the remote endpoint for disabling the extension at the remote endpoint; and
   configuring the local endpoint for locally disabling the extension.

17. The non-transitory computer-readable storage medium of claim 10, wherein the method further comprises:
   prior to sending the remote instruction, validating whether the extension can be performed by applying a set of validation rules on the network configuration information; and
   in response to an unsuccessful validation, providing an error notification to the user interface without sending the remote instruction.

18. The non-transitory computer-readable storage medium of claim 10, wherein the method further comprises:
   determining an error associated with the configuration of the local endpoint; and
   retrying to configure the local endpoint for a threshold number of times.

* * * * *